(12) United States Patent
Kimura

(10) Patent No.: US 10,083,639 B2
(45) Date of Patent: Sep. 25, 2018

(54) CONTROL DEVICE FOR CONTROLLING IMAGE DISPLAY DEVICE, HEAD-MOUNTED DISPLAY DEVICE, IMAGE DISPLAY SYSTEM, CONTROL METHOD FOR THE IMAGE DISPLAY DEVICE, AND CONTROL METHOD FOR THE HEAD-MOUNTED DISPLAY DEVICE

(75) Inventor: Fusashi Kimura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 1142 days.

(21) Appl. No.: 13/351,793

(22) Filed: Jan. 17, 2012

(65) Prior Publication Data
US 2012/0200592 A1 Aug. 9, 2012

(30) Foreign Application Priority Data

Feb. 4, 2011 (JP) ................ 2011-022208
Oct. 31, 2011 (JP) ................ 2011-238547

(51) Int. Cl.
| | |
|---|---|
| *G06T 5/00* | (2006.01) |
| *G09G 5/00* | (2006.01) |
| *G09G 3/00* | (2006.01) |
| *G02B 27/01* | (2006.01) |

(52) U.S. Cl.
CPC ........... *G09G 3/001* (2013.01); *G02B 27/017* (2013.01); *G02B 2027/014* (2013.01); *G02B 2027/0156* (2013.01); *G02B 2027/0178* (2013.01); *G09G 3/006* (2013.01)

(58) Field of Classification Search
CPC ......... G06T 1/20; G06T 19/006; G06T 11/60; G06T 2207/10016; G06T 2207/10152; G06T 2207/30201; G06T 7/004; G06T 7/0044; G06T 2207/10004; G02B 27/017; G02B 2027/0178; G02B 27/01; G06F 1/163; G02F 1/136286

USPC ....................................................... 345/619
See application file for complete search history.

(56) References Cited

U.S. PATENT DOCUMENTS

| | | | |
|---|---|---|---|
| 6,067,645 A | | 5/2000 | Yamamoto et al. |
| 7,061,477 B1 | * | 6/2006 | Noguchi ................ 345/204 |
| 7,453,417 B2 | * | 11/2008 | Watanabe ................ 345/1.1 |
| 7,911,473 B2 | * | 3/2011 | Noorbakhsh ........... G09G 5/363 |
| | | | 345/530 |

(Continued)

FOREIGN PATENT DOCUMENTS

| | | |
|---|---|---|
| CN | 1707308 A | 12/2005 |
| EP | 1 207 689 A1 | 5/2002 |

(Continued)

OTHER PUBLICATIONS

VESA Display Device Data Block (DDDB) Standard, Version 1, Sep. 25, 2006, © Copyright 2006 Video Electronics Standards Association, p. 1-29.*

*Primary Examiner* — Samantha (Yuehan) Wang
(74) *Attorney, Agent, or Firm* — Oliff PLC

(57) ABSTRACT

A control device that controls an image display device that forms an image on the basis of an image signal includes: an acquiring unit that acquires, from the image display device, individual information for specifying a control form of the image display device connected to the control device; and a control unit that controls the image display device on the basis of the acquired individual information.

18 Claims, 12 Drawing Sheets

(56) References Cited

U.S. PATENT DOCUMENTS

| | | | |
|---|---|---|---|
| 8,848,107 B2* | 9/2014 | Wada | H04N 5/38 |
| | | | 348/571 |
| 2002/0113907 A1 | 8/2002 | Endo et al. | |
| 2004/0239660 A1 | 12/2004 | Tsuda et al. | |
| 2005/0057487 A1 | 3/2005 | Takata et al. | |
| 2005/0248852 A1 | 11/2005 | Yamasaki | |
| 2006/0092187 A1* | 5/2006 | Wang | G09G 5/005 |
| | | | 345/698 |
| 2007/0046805 A1* | 3/2007 | Nakanishi | 348/333.01 |
| 2010/0053441 A1 | 3/2010 | Tokashiki et al. | |
| 2010/0079356 A1* | 4/2010 | Hoellwarth | G02B 27/017 |
| | | | 345/8 |
| 2010/0171747 A1* | 7/2010 | Bae | G09G 5/006 |
| | | | 345/531 |
| 2010/0283586 A1* | 11/2010 | Ikeda et al. | 340/10.42 |
| 2011/0016332 A1 | 1/2011 | Wu et al. | |
| 2011/0122126 A1 | 5/2011 | Han et al. | |
| 2011/0141236 A1 | 6/2011 | Mitani et al. | |
| 2011/0157310 A1 | 6/2011 | Mitani et al. | |
| 2011/0161843 A1* | 6/2011 | Bennett et al. | 715/760 |
| 2012/0154277 A1* | 6/2012 | Bar-Zeev et al. | 345/158 |
| 2012/0200592 A1 | 8/2012 | Kimura | |
| 2012/0274543 A1* | 11/2012 | Kawabata | G09G 3/2022 |
| | | | 345/89 |
| 2013/0016193 A1* | 1/2013 | Nepveu | G02B 27/017 |
| | | | 348/51 |
| 2015/0350626 A1 | 12/2015 | Han et al. | |

FOREIGN PATENT DOCUMENTS

| | | |
|---|---|---|
| JP | H06-035659 A | 2/1994 |
| JP | A-6-274137 | 9/1994 |
| JP | A-7-219490 | 8/1995 |
| JP | H08-328516 A | 12/1996 |
| JP | A-10-133840 | 5/1998 |
| JP | H11-331732 A | 11/1999 |
| JP | 2001-133724 A | 5/2001 |
| JP | A-2001-125551 | 5/2001 |
| JP | 2002-006817 A | 1/2002 |
| JP | 2002-189441 A | 7/2002 |
| JP | 2002-268623 A | 9/2002 |
| JP | 2004-294532 A | 10/2004 |
| JP | 2004-294707 A | 10/2004 |
| JP | 2005-086721 A | 3/2005 |
| JP | 2005-229352 A | 8/2005 |
| JP | 2005-321479 A | 11/2005 |
| JP | 2006-121553 A | 5/2006 |
| JP | 2006-203725 A | 8/2006 |
| JP | 2007-065899 A | 3/2007 |
| JP | B2-4089106 | 5/2008 |
| JP | 2008-228124 A | 9/2008 |
| JP | 2010-060863 A | 3/2010 |
| JP | 2010-088092 A | 4/2010 |
| JP | 2011-114863 A | 6/2011 |
| JP | 2011-171862 A | 9/2011 |
| JP | A-2011-203378 | 10/2011 |
| JP | 2012-074811 A | 4/2012 |
| JP | 2012-163637 A | 8/2012 |
| WO | 2011-113152 A1 | 9/2011 |

* cited by examiner

CONTROL DEVICE FOR CONTROLLING IMAGE DISPLAY DEVICE, HEAD-MOUNTED DISPLAY DEVICE, IMAGE DISPLAY SYSTEM, CONTROL METHOD FOR THE IMAGE DISPLAY DEVICE, AND CONTROL METHOD FOR THE HEAD-MOUNTED DISPLAY DEVICE

BACKGROUND

1. Technical Field

The present invention relates to a control device that controls an image display device, a head-mounted display device, which is a display device mounted on the head, an image display system, a control method for the image display device, and a control method for the head-mounted display device.

2. Related Art

In the past, there is known a control device that connects the control device and an image display device in a one-to-one relation and controls image display on the image display device. A connection device that discriminates specifications of the image display device and generates an identification signal is provided between the control device and the image display device. This enables the control device to control various image display devices (see, for example, JP-A-06-274137).

A head-mounted display device (a head mounted display), which is a display device mounted on the head, is known. For example, the head-mounted display device generates, using a liquid crystal display and a light source, image light representing an image and guides, using a projection optical system and a light guide plate, the generated image light to the eyes of a user to thereby cause the user to recognize a virtual image.

In the past, an information processing system including plural head-mounted display devices is known. With the information processing system, a user selects a head-mounted display device suitable for the user out of the plural head-mounted display devices and uses the selected head-mounted display device (see, for example, JP-A-10-133840).

Besides the above Patent Literatures, JP-A-07-219490, JP-A-2001-125551, and JP-A-2011-203378 are examples of related art.

The control device that controls the image display device needs to perform connection control in order to connect the control device and the image display device in a one-to-one relation. Therefore, it is not easy to change the image display device connected to the control device. By providing the connection device, the control device can control various image display devices. However, the connection device is necessary besides the control device and the image display device. In other words, an extra device is necessary.

In the head-mounted display device, for example, the user is allowed to connect and disconnect an image display device formed in a shape like eyeglasses and mounted on the head of the user and a control unit that controls image display by the image display device. Then, for example, in a company, plural control devices and plural image display devices are prepared and each user selects an arbitrary set of the control device and the image display device out of the control devices and the image display devices and uses the set of the control device and the image display device. This makes it possible to improve convenience.

However, for example, if image display control conditions (resolution and a frame rate, pixel arrangement, a scan direction, and a gamma value) are different because models of the plural image display devices are different from one another, it is likely that the control devices cannot normally control the image display devices. It is also conceivable to perform connection control for the control devices and the image display devices. However, the configurations and the control of the control devices and the image display devices are complicated.

SUMMARY

An advantage of some aspects of the invention is to realize the control of various image display devices with one control device. Another advantage of some aspects of the invention zs to easily suppress, in a head-mounted display device in which an image display device and a control device can be connected and disconnected, a deficiency of control of the image display device by the control device.

Application Example 1

This application example of the invention is directed to a control device that controls an image display device, the control device including: an acquiring unit that acquires, from the image display device, individual information for specifying a control form of the image display device connected to the control device; and a control unit that controls the image display device on the basis of the acquired individual information.

The control device acquires, from the image display device, the individual information for specifying the control form of the image display device connected to the control device and controls the image display device on the basis of the acquired individual information. Therefore, it is possible to realize the control of various image display devices with one control device.

Application Example 2

This application example of the invention is directed to a head-mounted display device including: an image display unit including an image-light generating unit that generates image light representing an image and a light guide unit that guides the generated image light to the eyes of a user, the image display unit causing the user to visually recognize a virtual image in a state in which the head-mounted display device is mounted on the head of the user and including a storing unit that stores individual information for specifying a control form of the image display unit by a control device; and the control device according to Application Example 1. The control device is detachably connected to the image display unit, reads out the individual information from the storing unit of the image display unit actually connected to the control device, and controls image display by the image display unit in a form corresponding to the read-out individual information.

In the head-mounted display device, the image display unit includes the storing unit that stores the individual information for specifying the control form of the image display unit by the control device. The control device reads out the individual information from the storing unit of the image display device actually connected to the control device and controls the image display by the image display unit in the form corresponding to the read-out individual information. Therefore, for example, even when an arbitrary set of a control device and an image display unit is selected out of plural control devices and plural image display units and used, it is possible to easily suppress a deficiency of control of the image display unit by the control device involved in, for example, a difference of the model of the image display unit while suppressing complication of the configurations and the control of the control devices and the image display units.

Application Example 3

This application example of the invention is directed to the head-mounted display device according to Application Example 2, wherein the individual information includes model identification information for identifying the model of the image display unit. The control device includes a storing unit that stores control information by model indicating correspondence between models and control forms of the image display unit. The control device specifies, on the basis of the model identification information, the model of the image display unit actually connected to the control device and controls image display by the image display unit in a control form associated with the specified model.

In the head-mounted display device, the control device includes the storing unit that stores the control information by model indicating the correspondence between the models and the control forms of the image display unit. The control device specifies, on the basis of the model identification information included in the individual information, the model of the image display unit actually connected to the control device and controls the image display by the image display unit in the control form associated with the specified model. Therefore, it is possible to easily suppress a deficiency of control of the image display unit by the control device and realize a reduction in the capacity of the storing unit of the image display unit.

Application Example 4

This application example of the invention is directed to the head-mounted display device according to Application Example 2 or 3, wherein the individual information includes adjustment information for specifying an image quality adjustment form of a virtual image recognized by the user. The control device causes the image display unit to adjust image quality in a form corresponding to the adjustment information.

In the head-mounted display device, the control device causes the image display unit to adjust image quality in the form corresponding to the adjustment information included in the individual information. Therefore, for example, even when an arbitrary set of a control device and an image display unit is selected out of plural control devices and plural image display units and used, it is possible to easily suppress image quality deterioration.

Application Example 5

This application example of the invention is directed to the head-mounted display device according to Application Example 4, wherein the adjustment information includes adjustment information by user indicating correspondence between users and image quality adjustment forms of the image display unit. The control device includes an information acquiring unit that acquires information for specifying a user of the image display unit actually connected to the control device. The control device causes the image display unit to adjust image quality in a form associated with the user specified by the information acquiring unit.

In the head-mounted display device, the control device acquires the information for specifying a user of the image display unit actually connected to the control device and causes the image display unit to adjust image quality in the form associated with the user specified in the adjustment information by user included in the adjustment information. Therefore, it is possible to easily perform image quality adjustment corresponding to the preference of the user.

Application Example 6

This application example of the invention is directed to the head-mounted display device according to any of Application Examples 2 to 5, wherein the control device checks an image display state of the image display unit at predetermined timing and, when the image display state is not normal, updates the control form of the image display unit by the control device on the basis of the individual information.

The head-mounted display device can be automatically reset even when a malfunction occurs. Therefore, it is possible to improve convenience.

Application Example 7

This application example of the invention is directed to the head-mounted display device according to any of Application Examples 2 to 6, wherein when the control device cannot normally perform the control of the image display unit actually connected to the control device, the control device notifies the user to that effect directly or via the image display unit.

The head-mounted display device can cause the user to recognize that the control of the image display unit actually connected to the control device cannot be normally performed. Therefore, it is possible to improve convenience.

Application Example 8

This application example of the invention is directed to the control device according to Application Example 1, which further includes a notifying unit that notifies, when the control device cannot normally cause the user to visually recognize an image via the image display device, the user to that effect.

When it is determined that the image display device is not a type of an image processing device adapted to the control device or is of a model adapted to the control device, the control device notifies the user of an error. Therefore, the control device can cause the user to recognize a problem of a connection correspondence relation between the control device and the image display device and a problem concerning display control and, according to necessity, urge the user to take measures. Therefore, it is possible to improve convenience.

Application Example 9

This application example of the invention is directed to the control device according to Application Example 8, wherein the control unit can switch, according to operation, a form for causing the user to two-dimensionally visually recognize an image, which the control unit causes the user to visually recognize via the image display device, and a form for causing the user to three-dimensionally visually recognize the image. When the control unit determines on the basis of the individual information that the image display device is not adapted to the form for causing the user to three-dimensionally visually recognize the image, the control unit causes the user to two-dimensionally visually recognize the image irrespective of the operation.

The control device can switch, according to the operation by the user, a form in which the image display device causes the user to visually recognize an image to two-dimension and three-dimension. When the control device determines on the basis of the individual information that the image display device cannot cause the user to three-dimensionally visually recognize the image, the control device causes the user to two-dimensionally visually recognize the image irrespective of the operation by the user. Therefore, when the image display device is adapted to the form for causing the user to three-dimensionally visually recognize the image, the control device can cause the user to visually recognize the image in a form desired by the user. In the control device, when the image display device is not adapted to the form for causing the user to three-dimensionally visually recognize the image, the user can display an appropriate image without need for extra operation.

Application Example 10

This application example of the invention is directed to the control device according to Application Example 8 or 9, wherein the control device is integrated with the image display device.

The control device and the image display device are integrated. Therefore, it is possible to realize an image display device having high portability.

Application Example 11

This application example of the invention is directed to the control device according to any of Application Examples 8 to 10, wherein the individual information includes device identification information for identifying the type of the image display device and a model identification information for identifying the model of the image display device. The control device includes a storing unit that stores control information by device indicating correspondence between types and control forms of the image display device and control information by model indicating correspondence between models and control forms of the image display device. The control device specifies, on the basis of the device identification information and the model identification information, the type and the model of the image display device actually connected to the control device and controls the image display device in a control form associated with the specified type and model of the image display device.

The control device includes the storing unit that stores the individual information of the image display device. The individual information is information for specifying a control form of the image display device by the control device. The control device reads out the individual information from a storage device of the image display device and controls the image display device in a control form corresponding to the read-out individual information. Therefore, in the control device, even when an arbitrary set of a control device and an image display device is selected out of plural control devices and plural image display devices and used, it is possible to suppress a deficiency of control of the image display device by the control device involved in, for example, a difference of the model of the image display device while suppressing complication of the configurations and the control of the control devices and the image display devices.

Application Example 12

This application example of the invention is directed to the control device according to any of Application Examples 8 to 11, wherein the image display device is one of a head-mounted display device, a projection display device, and a navigation display device.

If the image display device is the head-mounted display device, since the control device performs the control of image display, it is possible to reduce the weight of the image display device and improve wearability of the user. If the image display device is the projection display device, since the image display device can display an image if the image display device includes only components necessary minimum for the image display device, it is possible to improve portability. If the image display device is the navigation display device, it is unnecessary to mount needless components on the navigation display device.

Application Example 13

This application example of the invention is directed to an image display system including: an image display device that causes a user to visually recognize an image; and the control device according to any of Application Examples 8 to 12. The image display device receives a signal transmitted by the control device when the control device determines on the basis of the individual information that the control device is not adapted to the image display device, and the image display device causes the user to visually recognize an error image prepared in advance in order to notify the user that the control device is not adapted to the image display device.

In the image display system, when the control device determines on the basis of the individual information of the image display device that the control device is not adapted to the image display device, the control device transmits a signal indicating to that effect to the image display device. The image display device receives the signal and displays, with the error image prepared in advance, that an image cannot be normally displayed to the user. Therefore, in the image display system, even when the control device cannot control the image display device, the image display device causes the user to visually recognize the error image. Therefore, it is easy to cause the user to recognize error notification.

Application Example 14

This application example of the invention is directed to an image display system including: an image display device that causes a user to visually recognize an image; and the control device according to any of Application Examples 8 to 12. The image display device includes a power supply unit that supplies electric power to the image display device and the control device.

In the image display system, the image display device causes the user to visually recognize an image and incorporates the power supply unit that supplies electric power to the control device and the image display device. Therefore, it is possible to realize an image display system having high portability.

Application Example 15

This application example of the invention is directed to an image display system including: the control device according to any of Application Examples 8 to 12, the control device including an image-display-device authenticating unit that performs authentication of the image display device connected to the image display system; and an image display device including a control-device authenticating unit that performs authentication of the control device connected to the image display system.

In the image display system, the image-display-device authenticating unit of the control device performs authentication of the image display device. The image display device includes the control-device authenticating unit that can perform authentication of the control device. Therefore, the control device and the image display device perform authentication each other and determine whether the control device and the image display device are adapted to each other. When the control device and the image display device successfully authenticate each other, the control device controls the image processing device and causes the user to visually recognize an image via the image display device. Therefore, in the image display system, it is possible to realize an image display system having high security.

The invention can be implemented in various forms. For example, the invention can be implemented in forms such as a control device that controls an image display device, a head-mounted display device, an image display system, a control method for the image display device and a control method for the head-mounted display device, a head-mounted display system, a computer program for implementing functions of the methods, devices, or the systems, a recording medium having recorded therein the computer program, and a data signal including the computer program and embodied in a carrier wave.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
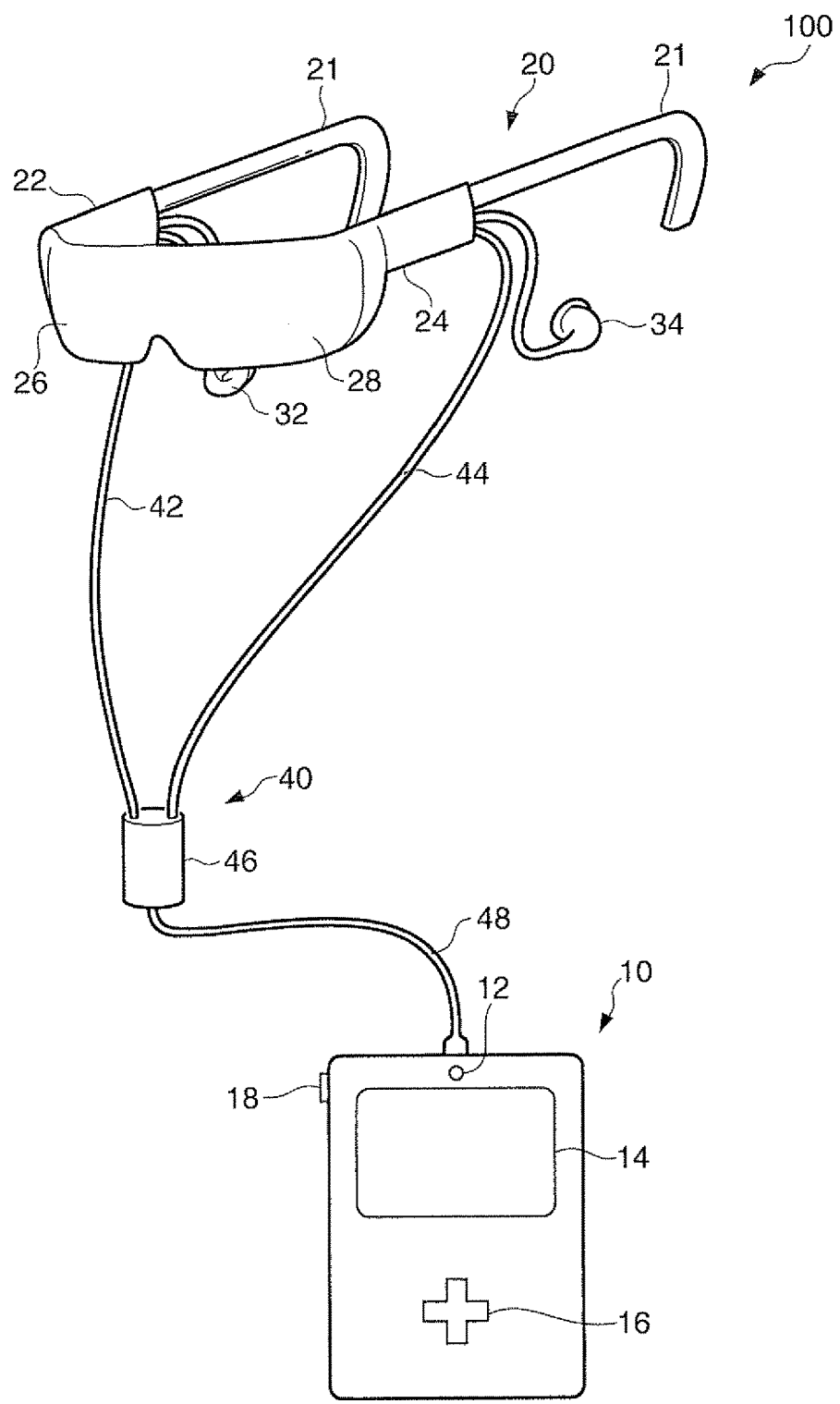
FIG. 1 is an explanatory diagram showing an external configuration of a head-mounted display device in a first embodiment of the invention.

Embodiments of the invention are explained in order described below.
A. First Embodiment
　A-1. Device configuration
　A-2. Control processing
B. Second Embodiment
C. Third Embodiment
D. Modifications A. First Embodiment A-1. Device Configuration FIG. 1 is an explanatory diagram showing an external configuration of a head-mounted display device 100 in a first embodiment of the invention. The head-mounted display device 100 is a display device mounted on the head and is also called head-mounted display (HMD). The head-mounted display device 100 in this embodiment is an optical transmissive head-mounted display device with which a user can visually recognize a virtual image and, at the same time, directly visually recognize an external scene.

The head-mounted display device 100 includes an image display unit 20 that causes the user to visually recognize a virtual image on the basis of an image signal in a state in which the image display unit 20 is mounted on the head of the user and a control unit (a controller) 10 that controls the image display unit 20.

The image display unit 20 is a mounted member mounted on the head of the user. In this embodiment, the image display unit 20 has an eyeglass shape. The image display unit 20 includes ear hooking sections 21 functioning as temples and a right optical panel 26 and a left optical panel 28 respectively located before the right and left eyes of the user in a state in which the user wears the image display unit 20. A right display driving unit 22 is arranged in a connect g place of the ear hooking section 21 for the right ear and the right optical panel 26. A left display driving unit 24 is arranged in a connecting place of the ear hooking section 21 for the left ear and the left optical panel 28. In the following explanation, the right display driving unit 22 and the left display driving unit 24 are collectively referred to simply as "display driving unit" The right optical panel 26 and the left optical panel 28 are collectively referred to simply as "optical panel".

The image display unit 20 further includes a right earphone 32 for the right ear and a left earphone 34 for the left ear. The right earphone 32 and the left earphone 34 are respectively worn on the right ear and the left ear when the user wears the image display unit 20.

The image display unit 20 further includes a connecting unit 40 for connecting the image display unit 20 to a control unit 10. The connecting unit 40 includes a main cable 48 connected to the control unit 10, a right cable 42 and a left cable 44, which are two cables branching from the main cable 48, and a coupling unit 46 provided at a branch point. The right cable 42 is connected to the right display driving unit 22. The left cable 44 is connected to the left display driving unit 24. The image display unit 20 and the control unit 10 perform transmission of various signals via the connecting unit 40. Connectors (not shown) that fit with each other are respectively provided at an end on the opposite side of the coupling unit 46 in the main cable 48 and the control unit 10. The control unit 10 and the image display unit 20 are connected and disconnected by fitting the connector of the main cable 48 and the connector of the control unit 10 and releasing the fitting.

The control unit 10 is a device that controls image display by the image display unit 20. The control unit 10 includes a power switch 18 that switches ON and OFF of a power supply, a lighting unit 12 that notifies an operation state of the head-mounted display device 100 (e.g., an ON or OFF state of the power supply) with a light emission state, a touch pad 14 that detects finger operation by the user and outputs a signal corresponding to the finger operation, and a cross key 16 that detects pressing operation of keys corresponding to up, down, left, and right directions and outputs a signal corresponding to the operation. As the lighting unit 12, for example, one or plural LED lamps can be used. As the touch pad 14, various touch pads such as an electrostatic touch pad, a pressure detecting touch pad, and an optical touch pad can be used.

Figure 2:
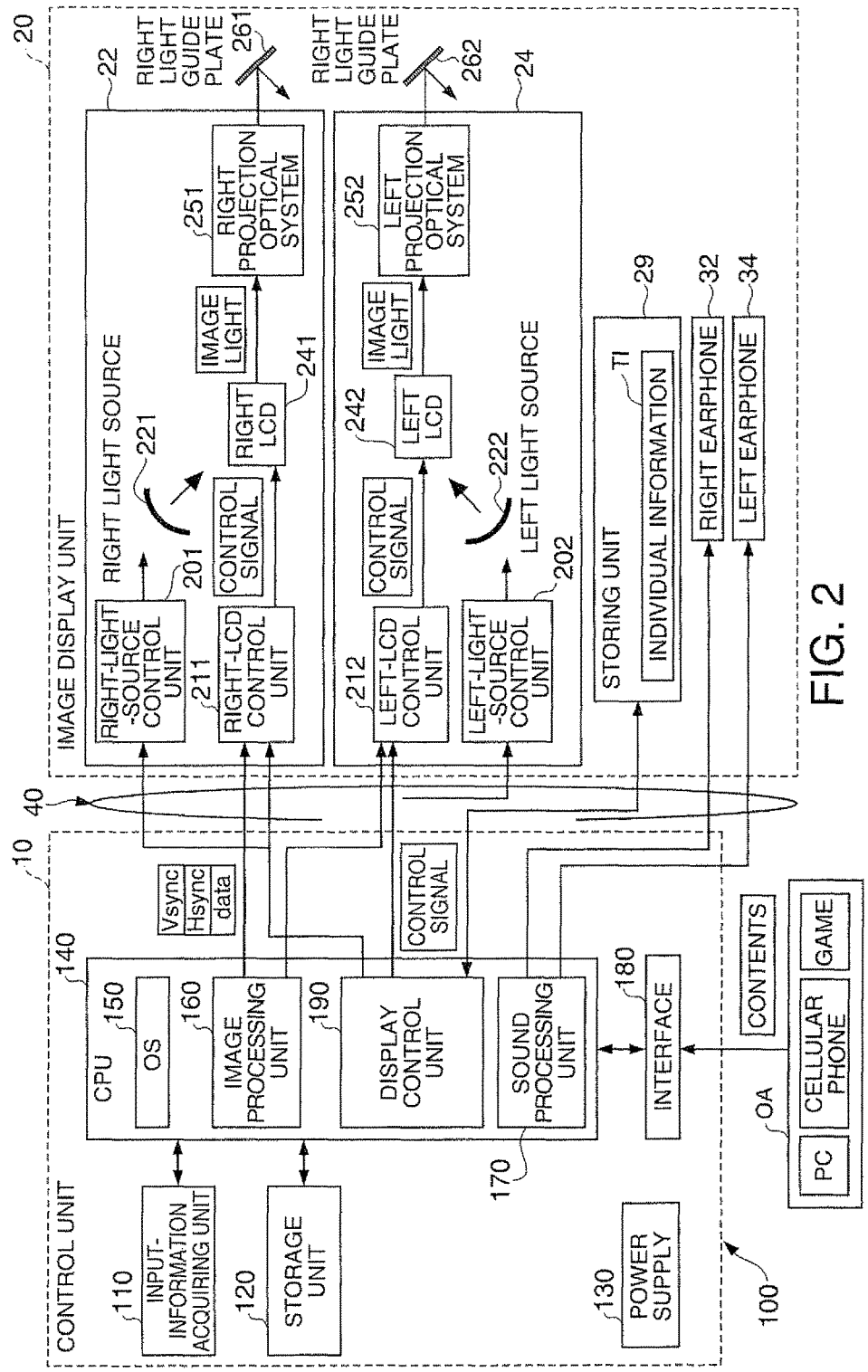
FIG. 2 is an explanatory diagram functionally showing the configuration of the head-mounted display device.

FIG. 2 is an explanatory diagram functionally showing the configuration of the head-mounted display device 100. As shown in FIG. 2, the control unit 10 includes a CPU 140, a storing unit 120 including a ROM and a RAM, a power supply 130 that supplies electric power to the units of the head-mounted display device 100, an input-information acquiring unit 110 that acquires signals corresponding to operation inputs (e.g., operation inputs to the touch pad 14, the cross key 16, and the power switch 18) by the user, and an interface 180 for connecting various external apparatuses OA (e.g., a personal computer, a cellular phone terminal, and a game terminal), which are supply sources of content data such as an image (a still image or a moving image) and sound. As the power supply 130, for example, a secondary battery can be used. As the interface 180, for example, a USB interface, an interface for memory card, and a radio LAN interface can be adopted.

Various computer programs are stored in the storing unit 120. The CPU 140 reads out the computer programs from the storing unit 120 and executes the computer programs to thereby function as an operating system (OS) 150, an image processing unit 160, a display control unit 190, and a sound processing unit 170.

The image processing unit 160 generates a vertical synchronization signal VSync, a horizontal synchronization signal HSync, and image data Data on the basis of content data input via the interface 180 and supplies these signals to the image display unit 20 via the connecting unit 40. Specifically, the image processing unit 160 acquires an image signal (e.g., an analog signal including thirty frame images per one second) included in the content data, separates synchronization signals such as the vertical synchronization signal VSync and the horizontal synchronization signal HSync from the acquired image signal, and converts an analog image signal, from which the synchronization signals are separated, into a digital image signal to generate the image data Data. The image processing unit 160 may executes resolution conversion processing, color tone correction processing, and the like for the image data according to necessity.

The display control unit 190 generates control signals for controlling the right display driving unit 22 and the left display driving unit 24 and supplies the control signals to the image display unit 20 via the connecting unit 40 to thereby control an image display state in the image display unit 20. Specifically, the display control unit 190 separately controls, according to the control signals, ON and OFF of driving of a right LCD 241 by a right LCD-control unit 211, ON and OFF of driving of a right light source 221 by a right-light-source control unit 201, ON and OFF of driving of a left LCD 242 by a left LCD control unit 212, and ON and OFF of driving of a left light source 222 by a left-light-source control unit 202 to thereby control presence or absence of generation of image lights by the right display driving unit 22 and the left display driving unit 24. For example, the display control unit 190 causes both the right display driving unit 22 and the left display driving unit 24 to generate image lights, causes only one of the display driving units to generate image light, or does not cause both the display driving units to generate image light.

The sound processing unit 170 acquires a sound signal included in the content data, amplifies the acquired sound signal, and supplies the sound signal to the right earphone 32 and the left earphone 34 of the image display unit 20 via the connecting unit 40.

The right display driving unit 22 of the image display unit 20 includes the right light source 221 including, for example, an LED lamp, the right-light-source control unit 201 that drives the right light source 221 on the basis of a control signal supplied from the control unit 10, the right liquid crystal display (LCD) 241 that modulates illumination light irradiated from the right light source 221 into image light representing an image, and the right LCD-control unit 211 that controls to drive the right LCD 241 on the basis of the vertical synchronization signal VSync, the horizontal synchronization signal HSync, and the image data Data supplied from the control unit 10. The right LCD 241 is configured by using, for example, a transmissive liquid crystal panel. The right light source 221, the right-light-source control unit 201, the right LCD 241, and the right LCD-control unit 211 are equivalent to the image-light generating unit in the invention. The right display driving unit 22 further includes a right projection optical system 251 that projects generated image light. The right projection optical system 251 is configured by using, for example, a collimate lens.

The right optical panel 26 (FIG. 1) of the image display unit 20 includes a right light guide plate 261. The right light guide plate 261 guides image light, which is output from the right projection optical system 251, to the right eye of the user while reflecting the image light along a predetermined optical path. The right projection optical system 251 and the right light guide plate 261 are equivalent to the light guide unit in the invention.

Like the right display driving unit 22, the left display driving unit 24 includes the left light source 222, the left-light-source control unit 202, the left LCD 242, the left LCD control unit 212, and a left projection optical system 252. The configurations and the functions of the components included in the left display driving unit 24 are the same as those of the components included in the right display driving unit 22. Therefore, explanation of the components is omitted. The left optical panel 28 of the image display unit 20 includes a left light guide plate 262. The left light guide plate 262 guides image light, which is output from the left projection optical system 252, to the left eye of the user while reflecting the image light along a predetermined optical path. The left light source 222, the left-light-source control unit 202, the left LCD 242, and the left LCD control unit 212 are equivalent to the image-light generating unit in the invention. The left projection optical system 252 and the left light guide plate 262 are equivalent to the light guide unit in the invention.

Figure 3:
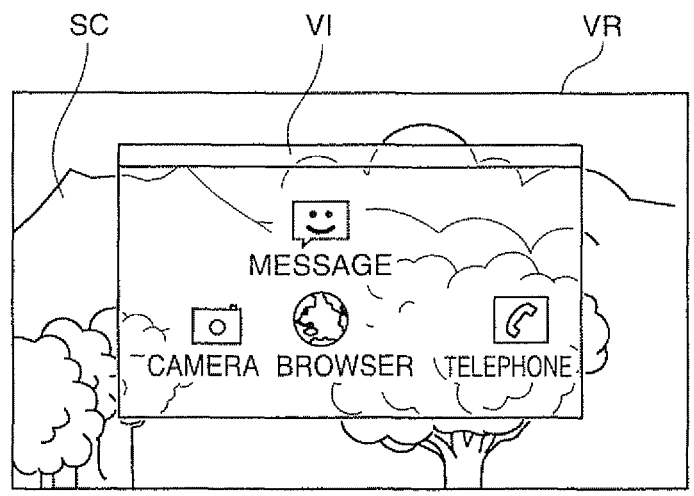
FIG. 3 is an explanatory diagram showing an example of a virtual image recognized by a user.

The image lights guided to both the eyes of the user of the head-mounted display device 100 are focused on the retinas, whereby the user visually recognizes a virtual image. FIG. 3 is an explanatory diagram showing an example of the virtual image recognized by the user. As shown in FIG. 3, a virtual image VI is displayed in a visual field VR of the user of the head-mounted display device 100. In the visual field VR of the user except a portion where the virtual image VI is displayed in the visual field VR, the user can see an external scene SC through the right optical panel 26 and the left optical panel 28. In the head-mounted display device 100 in this embodiment, in the portion where the virtual image VI is displayed in the visual field VR of the user, the user can also see the external scene SC in the background of the virtual image VI.

The right optical panel 26 and the left optical panel 28 may include light modulating plates that are provided on the front side of the right light guide plate 261 and the left light guide plate 262 (a side opposite to the side of the eyes of the user) and can adjust light transmittance. When the light modulating plates are provided, it is possible to adjust an amount of outside light entering the eyes of the user and adjust easiness of visual recognition of a virtual image by adjusting the light transmittance of the light modulating plates.

The image display unit 20 includes a storing unit 29 (FIG. 2). Readout from and writing in the storing unit 29 can be performed by the display control unit 190 of the control unit 10. The storing unit 29 includes, for example, a flash memory.

Figure 4:
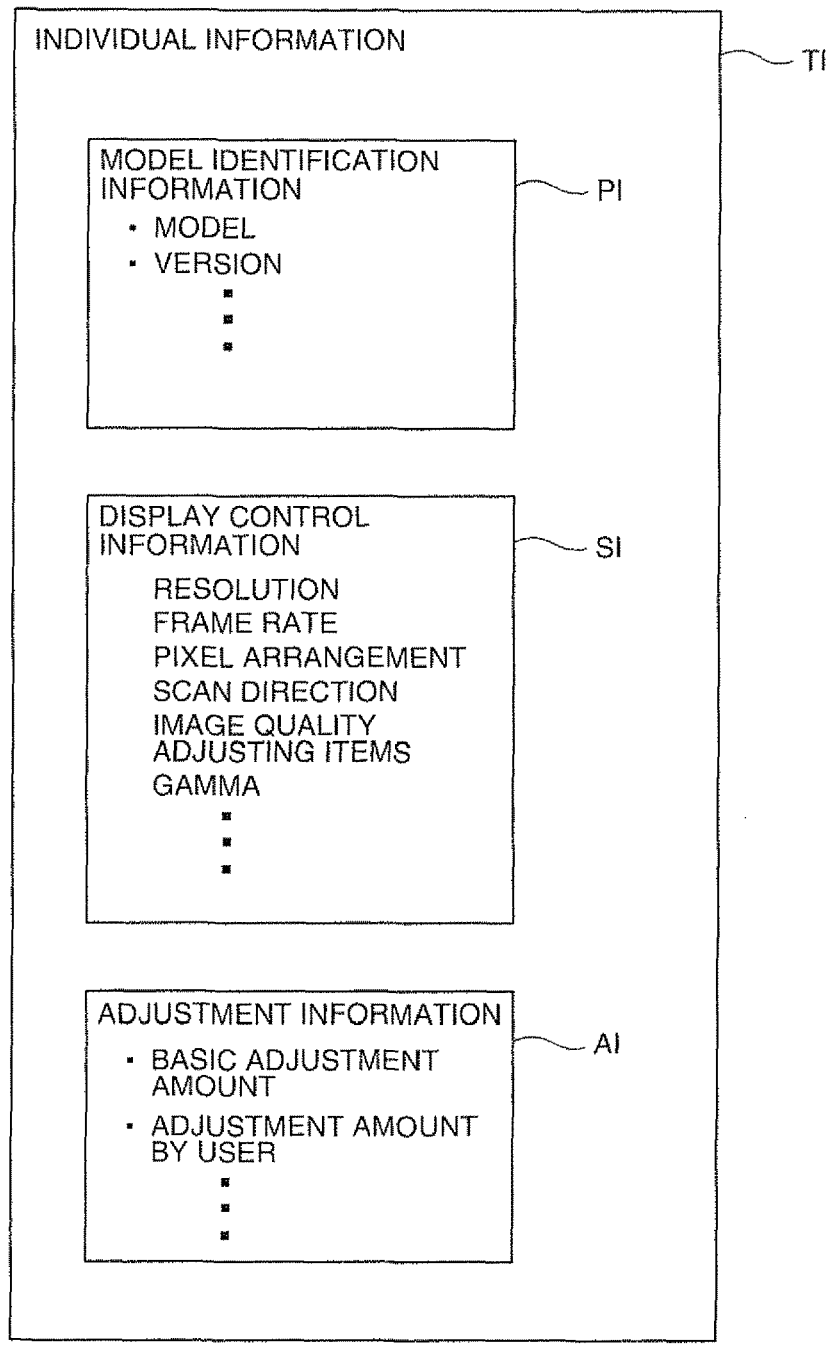
FIG. 4 is an explanatory diagram illustratively showing content of individual information.

The individual information TI is stored in the storing unit 29 of the image display unit 20. FIG. 4 is an explanatory diagram illustratively showing content of the individual information TI. As shown in FIG. 4, the individual information TI includes model identification information PI, display control information SI, and adjustment information AI.

The model identification information PI is information for enabling identification of the model of the image display unit 20. The model identification information PI includes, for example, model information and version information of the image display unit 20. A combination of a model and a version is equivalent to a model in a broader sense. For example, the same model and a different version of the image display unit 20 can be perceived as a different model (in a broader sense).

The display control information SI is information used for the control of the image display unit 20 (image display control) by the control unit 10. The display control information SI includes, for example, information for specifying the resolutions and frame rates, pixel arrangements, scan directions, image quality adjustment items, gamma values, and the like of the right LCD 241 and the left LCD 242.

The adjustment information AI is information concerning image quality adjustment for a virtual image recognized by the user with the image display unit 20. The adjustment information AI includes, for example, luminance adjustment values of the right light source 221 and the left light source 222 and image forming position adjustment values in the right LCD 241 and the left LCD 242. In this embodiment, the adjustment information AI includes information indicating a basic adjustment amount stored in the storing unit 29 during product shipment and information indicating an adjustment amount by user stored in the storing unit 29 in a process of use by the user.

A-2. Control Processing

Figure 5:
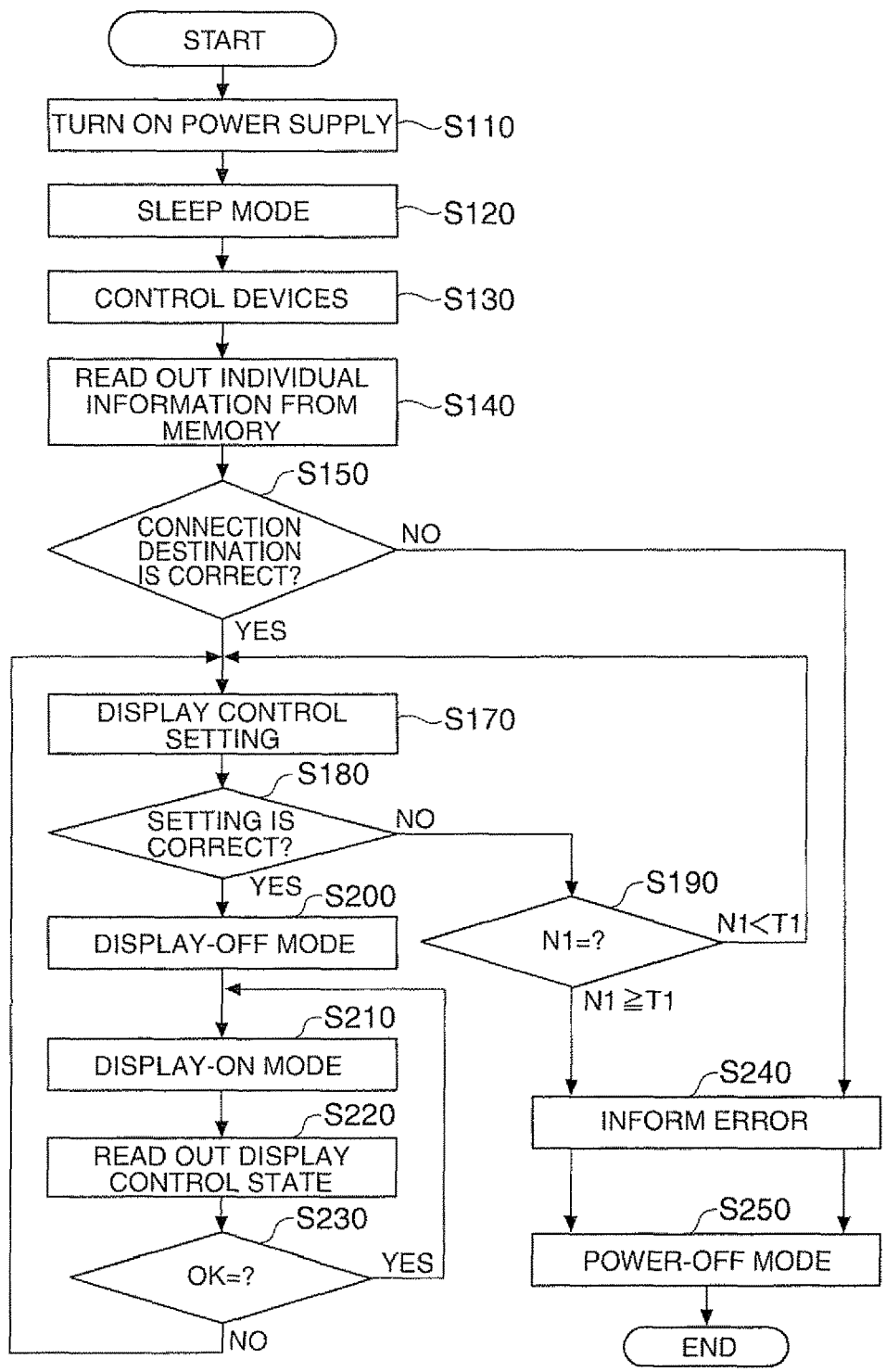
FIG. 5 is a flowchart for explaining a flow of control processing by the head-mounted display device in the first embodiment.

FIG. 5 is a flowchart for explaining a flow of control processing by the head-mounted display device 100 in this embodiment. The control processing is processing for the control unit 10 to control image display by the image display unit 20. When the user presses the power switch 18 and turns on the power supply for the head-mounted display device 100 (step S110), the control unit 10 sets the head-mounted display device 100 in a sleep mode (step S120) and performs initial control of the devices (step S130). At this point, the virtual image VI is not displayed in the visual field VR of the user yet.

Subsequently, the display control unit 190 of the control unit 10 reads out the individual information TI from the storing unit 29 of the image display unit 20 actually connected to the control unit 10 and stores the read-out individual information TI in, for example, a predetermined area of the storing unit 120 (step S140). The control unit 10 performs consistency check of the read-out individual information TI through, for example, error detection. When the read-out individual information TI is inconsistent, the control unit 10 may readout the individual information TI from the storing unit 29 again. When the consistency check of the individual information TI is not completed by reading out the individual information TI plural times, the control unit 10 may forcibly turns off the power supply.

The display control unit 190 of the control unit 10 determines on the basis of the model identification information PI included in the individual information TI whether a connection relation between the control unit 10 and the image display unit 20 is correct (step S150). This determination is determination whether the control unit 10 can normally perform the control of the image display unit 20. Specifically, for example, the display control unit 190 specifies the model of the image display unit 20 on the basis of the model identification information PI and determines, according to whether the model of the image display unit 20 is a model adapted to the control unit 10, whether the connection relation is correct.

When the display control unit 190 determines that the connection relation is incorrect (i.e., the control unit 10 cannot normally perform the control of the image display unit 20), the control unit 10 notifies the user of an error (step S240). An error notifying method is executed by turning on and off the lighting unit 12 of the control unit 10. The error notification may be executed via the image display unit 20 if possible. For example, when sound signals can be supplied to the earphones 32 and 34 of the image display unit 20 via the sound processing unit 170, the error notification may be performed by outputting sound for notifying the error from the earphone 32 and 34. For example, when image signals can be supplied to the display driving units 22 and 24 of the image display unit 20 via the image processing unit 160, the error notification may be performed by causing the user to recognize an image for notifying the error. After the error notification, the control unit 10 turns off the power supply for the head-mounted display device 100 (step S250).

When the display control unit 190 determines that the connection relation is correct (i.e., the control unit 10 can normally perform the control of the image display unit 20), the display control unit 190 of the control unit 10 performs display control setting according to the display control information SI of the individual information TI (step S170). Specifically, the display control unit 190 specifies, on the basis of the display control information SI included in the individual information TI, the resolutions and frame rates, pixel arrangements, scan directions, image quality adjustment items, gamma values, and the like of the right LCD 241 and the left LCD 242 and sets values of the specified items in the image processing unit 160.

When the adjustment information AI is included in the individual information TI, the display control unit 190 sets a basic adjustment amount of the adjustment information AI in the image processing unit 160 and the right LCD-control unit 211 and the left LCD control unit 212 of the image display unit 20. Consequently, image quality adjustment for adjusting product variation is set. When information concerning an adjustment amount by user is included in the adjustment information AI, the display control unit 190 sets the adjustment amount by user in addition to the basic adjustment amount. When adjustment amount information by user corresponding to plural users is included as the information concerning the adjustment amount by user, the adjustment amount by user corresponding to one user selected by an arbitrary method may be set. A user may be specified on the basis of information acquired via the input-information acquiring unit 110 by the control unit 10 and the adjustment amount by user corresponding to the specified user may be set.

The control unit 10 determines whether the display control setting is correct (step S180). When the control unit 10 determines that the display control setting is incorrect, the control unit 10 determines whether the number of times N1 of the display control setting being determined as incorrect is smaller than a predetermined threshold T1 (step S190). When the number of times N1 is smaller than the predetermined threshold TI, the control unit 10 performs the display control setting again (step S170). When the number of times N1 of the display control setting being determined as incorrect is equal to or larger than the predetermined threshold T1, the control unit 10 notifies the user of an error (step S240). An error notifying method is the same as the error notifying method for notifying an error when the connection relation is determined as incorrect. After the error notification, the control unit 10 turns off the power supply for the head-mounted display device 100 (step S250).

When the control unit 10 determines that the display control setting is correct, first, the control unit 10 starts up the image display unit 20 in a display-off mode for not performing image display (step S200). Thereafter, the control unit 10 shifts the mode of the image display unit 20 to a display-on mode for performing image display (step S210). Consequently, as shown in FIG. 3, the virtual image VI is displayed in the visual field VR of the user. In the display-on mode, the control of the image display unit 20 by the control unit 10 is performed in the control form set in the display control setting (step S170). When the image quality adjustment is set in the display control setting, the control unit 10 causes the image display unit 20 to perform the image quality adjustment in the set form. In the display-on mode, the user can manually perform the image quality adjustment. When the user manually performs the image quality adjustment, adjustment amounts of the adjustment items are stored in the adjustment information AI of the individual information TI in association with user specifying information.

When the image display unit 20 is in the display-on mode, the display control unit 190 of the control unit 10 reads out a display control state from the image display unit 20 at predetermined timing (step S220) and checks whether the image display unit 20 is normally controlled (step S230). When the image display unit 20 is normally controlled, the image display in the display-on mode is continued (step S210).

On the other hand, when it is determined that the display control state is not normal, the display control unit 190 of the control unit 10 performs display control setting (setting update) according to the display control information SI of the individual information T1 (step S170). Thereafter, the display control unit 190 shifts to the display-on mode (step S210) through the display-off mode (step S200).

In the head-mounted display device 100 in this embodiment explained above, the image display unit 20 includes the storing unit 29 that stores the individual information TI. The individual information TI is information for specifying a control form (e.g., resolution and a frame rate, pixel arrangement, a scan direction, image quality adjustment items, and a gamma value) of the image display unit 20 by the control unit 10. The control unit 10 reads out the individual information TI from the storing unit 29 of the image display unit 20 and controls the image display unit 20 in a control form corresponding to the read-out individual information TI. Therefore, in the head-mounted display device 100 in this embodiment, for example, even when an arbitrary set of the control unit 10 and the image display unit 20 is selected out of plural control units 10 and plural image display units 20 and used, it is possible to suppress a deficiency of control of the image display unit 20 by the control unit 10 involved in, for example, a difference of the model of the image display unit 20 while suppressing complication of the configurations and the control of the control units 10 and the image display units 20.

In the head-mounted display device 100 in this embodiment, the adjustment information AI can be included in the individual information T1 stored in the storing unit 29 of the image display unit 20. The adjustment information AI is information concerning image quality adjustment of a virtual image recognized by the user with the image display unit 20. When the adjustment information AI is included in the individual information TI, the control unit 10 causes the image display unit 20 to perform image quality adjustment in a form specified by the adjustment information AI. Therefore, in the head-mounted display device 100 in this embodiment, for example, even when an arbitrary set of the control unit 10 and the image display unit 20 is selected out of the plural control units 10 and the plural image display units 20 and used, the control unit 10 can perform the image quality adjustment to compensate for product characteristics of the image display unit 20 actually connected to the control unit 10 (optical characteristics of the device, an output level of the power supply, light source characteristics, etc). Therefore, it is possible to easily suppress image quality deterioration.

In the head-mounted display device 100 in this embodiment, information indicating adjustment amounts by user stored in the storing unit 29 in a process of use by users can be included in the adjustment information AI. The control unit 10 specifies a user and causes the image display unit 20 to perform the image quality adjustment on the basis of an adjustment amount by user corresponding to the specified user. Therefore, in the head-mounted display device 100 in this embodiment, for example, even when an arbitrary set of the control unit 10 and the image display unit 20 is selected out of the plural control units 10 and the plural image display units 20 and used, it is possible to easily perform image quality adjustment corresponding to the preference of the user.

In the head-mounted display device 100 in this embodiment, when it is determined that the display control state is not normal, the control unit 10 performs the display control setting (the setting update) on the basis of the individual information TI. Therefore, even when a malfunction such as coming-off of a cable occurs, the head-mounted display device 100 can be automatically reset. Therefore, it is possible to improve convenience.

In the head-mounted display device 100 in this embodiment, when it is determined that the control unit 10 cannot normally perform the control of the image display unit 20 or when it is determined that the display control setting of the image display unit 20 by the control unit 10 is incorrect, the control unit 10 notifies the user of an error via turning on and off of the lighting unit 12 of the control unit 10, sound output or image display in the image display unit 20, or the like. Therefore, the head-mounted display device 100 in this embodiment can cause the user to recognize a problem of a connection correspondence relation between the control unit 10 and the image display unit 20 in the head-mounted display device 100 and a problem concerning display control and, according to necessity, urge the user to take measures. Therefore, it is possible to improve convenience.

B. Second Embodiment

Figure 6:
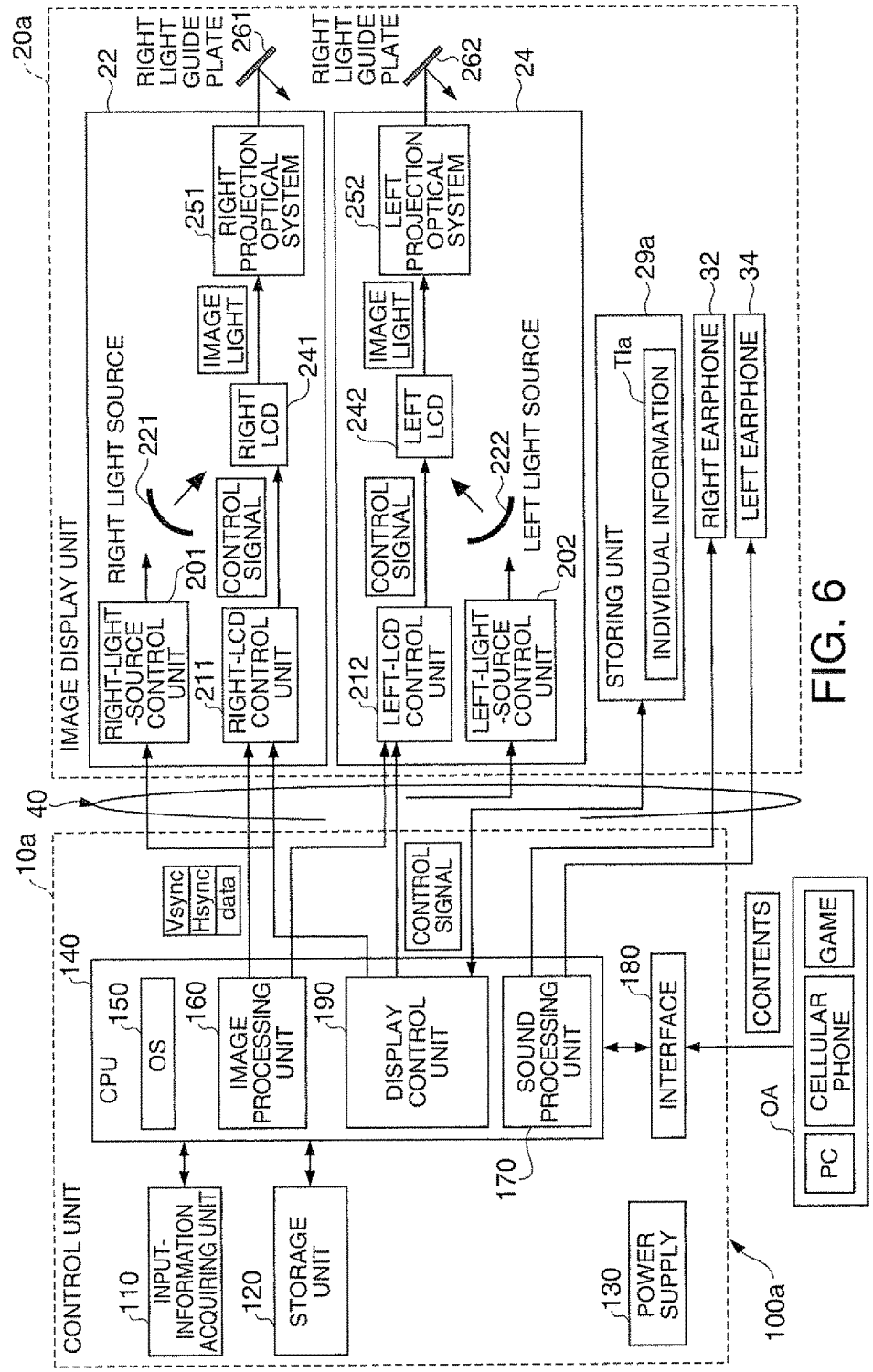
FIG. 6 is an explanatory diagram functionally showing the configuration of a head-mounted display device in a second embodiment.

FIG. 6 is an explanatory diagram functionally showing the configuration of a head-mounted display device 100a in a second embodiment. The head-mounted display device 100a in the second embodiment is different from the head-mounted display device 100 in the first embodiment in content of individual information TIa of information stored in a storing unit 29a of an image display unit 20a. Otherwise, the head-mounted display device 100a is the same as the head-mounted display device 100. A control unit 10a in the second embodiment is equivalent to the control device and the control unit in the invention. The image display unit 20a is equivalent to the image display device in the invention.

Figure 7:
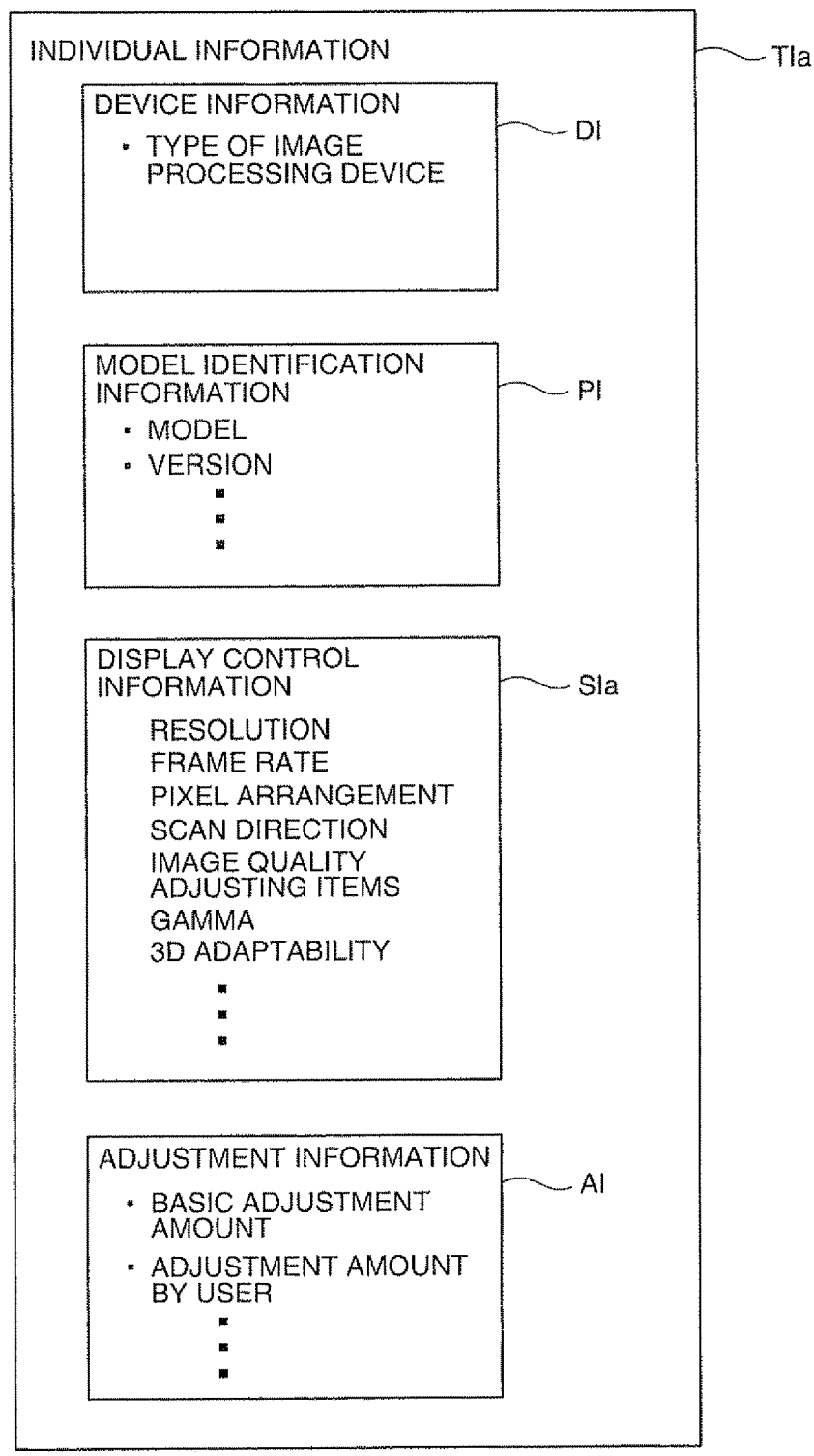
FIG. 7 is an explanatory diagram illustratively showing content of individual information in the second embodiment.

FIG. 7 is an explanatory diagram illustratively showing the content of the individual information TIa in the second embodiment. As shown in FIG. 7, the individual information TIa in the second embodiment is different from the individual information TI in the first embodiment in that the individual information TIa includes device information DI in addition to the model identification information PI, the display control information SI, and the adjustment information AI included in the individual information TI in the first embodiment. Display control information SIa included in the individual information TIa in the second embodiment includes 3D-adaptability information concerning whether the image display unit 20a can three-dimensionally display an image. The 3D-adaptability information may be included in the display control information SI in the first embodiment. The device information DI is equivalent to the device identification information in the invention.

The device information DI is information for enabling identification of the type of an image processing device connected to the control unit 10a. The type of the image processing device connected to the control unit 10a is not limited to only the image display unit 20a worn like eyeglasses in the second embodiment and may be, for example, types of image display devices such as a projection display device that displays an image on a projection surface through projection and a navigation display device.

Figure 8:
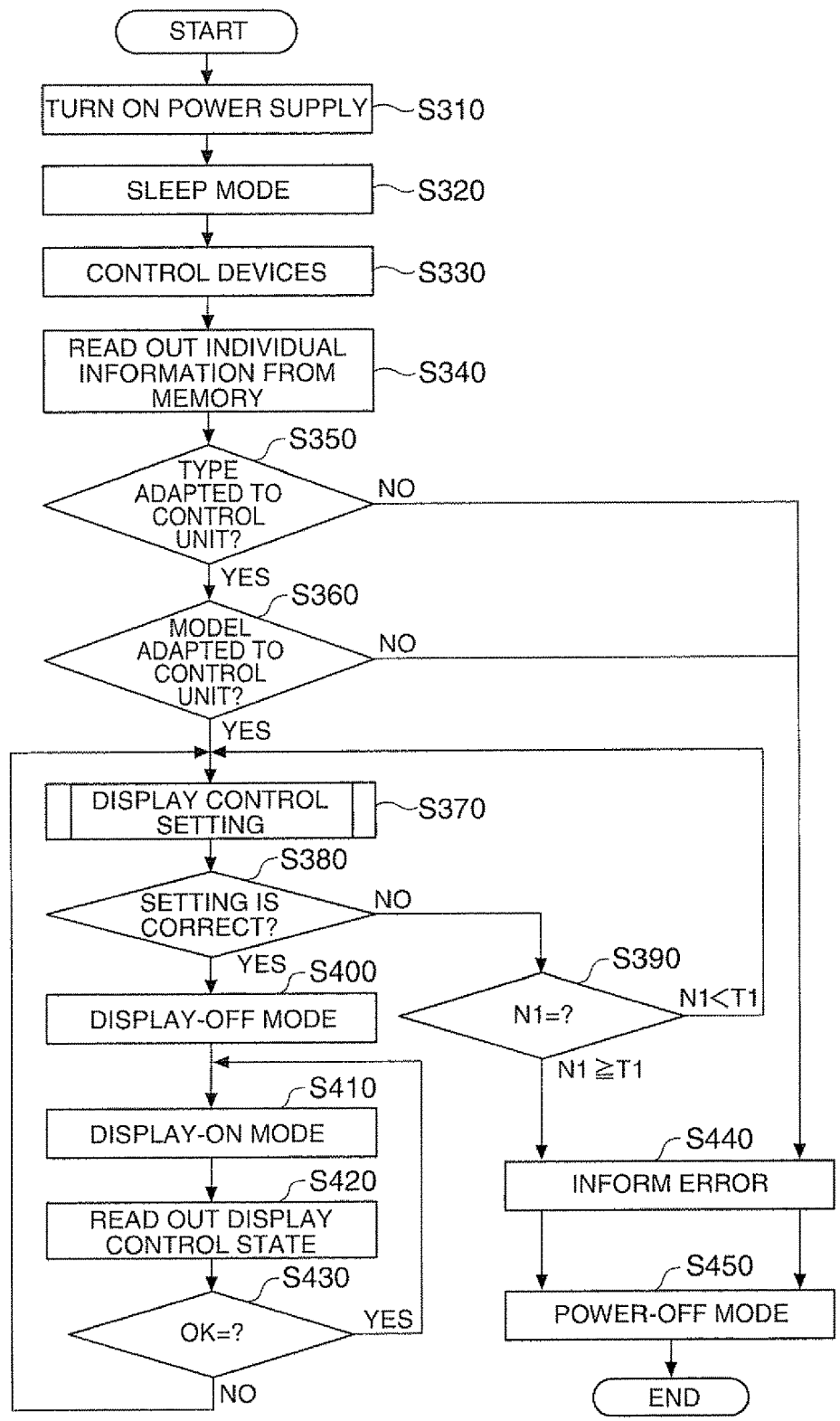
FIG. 8 is a flowchart for explaining a flow of control processing by the head-mounted display device in the second embodiment.

FIG. 8 is a flowchart for explaining a flow of control processing by the head-mounted display device 100a in the second embodiment. Processing in steps S310 to S340 shown in FIG. 8 is the same as the processing in steps S110 to S140 in the first embodiment shown in FIG. 5. The control processing in the second embodiment is different from the control processing in the first embodiment in steps S350, S360, and 9370 shown in FIG. 8. Processing in steps S380 to S450 shown in FIG. 8 is the same as the processing in steps S180 to S250 in the first embodiment.

The display control unit 190 of the control unit 10a reads out the individual information TIa from the storing unit 29a of the image display unit 20a and stores the individual information TIa in a predetermined area of the storing unit 120 (step S340). Then, the display control unit 190 determines on the basis of the device information DI included in the individual information TIa whether the type of the image display unit 20a is a type adapted to the control unit 10a (step S350). This determination is determination whether the control unit 10a can normally perform the control of the image display unit 20a. Specifically, for example, the display control unit 190 specifies the type of the image display unit 20a on the basis of the device information DI and determines, according to whether the type of the image display unit 20a is a type adapted to the control unit 10a, whether an image can be displayed on the image display unit 20a.

When the display control unit 190 determines that the type of the image display unit 20a is not a type adapted to the control unit 10a (i.e., the control unit 10a cannot normally perform the control of the image display unit 20a) (NO in step S350), the control unit 10a notifies the user of an error (step S440).

When the display control unit 190 determines that the type of the image display unit 20a is a type adapted to the control unit 10a (YES in step S350), the display control unit 190 determines whether the image display unit 20a is a model adapted to the control unit 10a (step S360). The display control unit 190 of the control unit 10a determines on the basis of the model identification information PI included in the identification information TIa whether the image display unit 20a is a model adapted to the control unit 10a. This determination is also determination whether the control unit 10a can normally perform the control of the image display unit 20a. Specifically, for example, the display control unit 190 specifies the model of the image display unit 20a on the basis of the model identification information PT and determines, according to whether the model of the image display unit 20a is a model adapted to the control unit 10a, whether the image can be displayed on the image display unit 20a.

When the display control unit 190 determines that the image display unit 20a is a model adapted to the control unit 10a (i.e., the control unit 10a can normally perform the control of the image display unit 20a) (YES in step S360), the control unit 10a performs display control setting processing (step S370).

Figure 9:
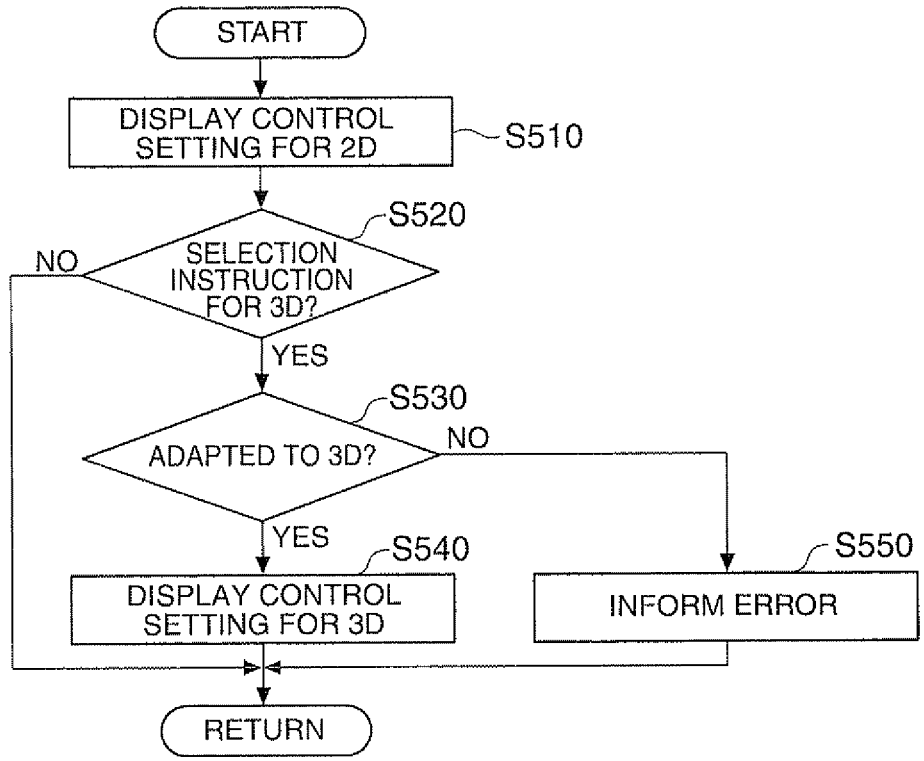
FIG. 9 is a flowchart for explaining a flow of display control setting processing in the second embodiment.

FIG. 9 is a flowchart for explaining a flow of the display control setting processing in the second embodiment. In the display control setting processing, first, the display control unit 190 of the control unit 10a performs display control setting for realizing two-dimensional (2D) display (step S510). Specifically, the display control unit 190 specifies, on the basis of the display control information SIa included in the individual information TIa, the resolutions and frame rates, pixel arrangements, scan directions, image quality adjustment items, gamma values, and the like of the right LCD 241 and the left LCD 242 and sets values of the specified items in the image processing unit 160.

Thereafter, the control unit 10a receives a selection instruction for three-dimensional (3D) display of an image by the user (step S520). The user can perform the selection instruction for 3D display of an image by operating the control unit 10a. When the user does not perform the selection instruction for the 3D display (NO in step S520), the display control unit 190 continues the display control setting for 2D display.

When the user performs the selection instruction for the 3D display (YES in step S520), the display control unit 190 of the control unit 10a determines on the basis of the display control information SIa included in the individual information TIa whether the image display unit 20a can three-dimensionally display an image (step S530). When the display control unit 190 determines on the basis of the display control information SIa that the image display unit 20a cannot three-dimensionally display an image (NO in step S530), the control unit 10a notifies the user of an error (step S550). The display control unit 190 continues the display control setting for the 2D display. The error notification may be displayed as an image on the image display unit 20a or may be emitted as sound via the earphones 32 and 34.

When the display control unit 190 determines on the basis of the display control information SIa that the image display unit 20a can three-dimensionally display an image (YES in step S530), the display control unit 190 performs the display control setting for the 3D display (step S540) and ends the display control setting processing. In the case of the 3D display, unlike the display control setting for the 2D display, image light guided to the right eye of the user and the image light guided to the left eye of the user are different in order to cause the user to three-dimensionally visually recognize an image.

As explained above, the control unit 10a in the second embodiment acquires, from the image display unit 20a, the individual information TIa for specifying a control form of the image display unit 20a connected to the control unit 10a (e.g., a type, a model, resolution and a frame rate, pixel arrangement, a scan direction, image quality adjustment items, and a gamma value of an image processing device). The control unit 10a controls the image display unit 20a on the basis of the acquired individual information TIa. Therefore, the control unit 10a in the second embodiment can realize control of various image display units 20a with one control unit 10a.

When it is determined that the type of the image display unit 20a is not a type adapted to the control unit 10a or when it is determined that the image display unit 20a is not a model adapted to the control unit 10a, the control unit 10a in the second embodiment notifies the user of an error via turning on and off of the lighting unit 12 of the control unit 10a, sound output or image display in the image display unit 20a, or the like. Therefore, the control unit 10a can cause the user to recognize a problem of a connection correspondence relation between the control unit 10a and the image display unit 20a and a problem concerning display control and, according to necessity, urge the user to take measures. Therefore, it is possible to improve convenience.

In the display control setting processing in the second embodiment, first, the display setting control in the 2D display is performed. When the control unit 10a is operated by the user, the control unit 10a can switch the 2D display and the 3D display according to a selection instruction of the user. When the control unit 10a determines on the basis of the display control information SIa of the individual information TIa that the image display unit 20a cannot perform the 3D display, the control unit 10a continues the display control setting in the 2D display. Therefore, when the image display unit 20a can perform the 3D display, the control unit 10a in the second embodiment can freely select the 2D display or the 3D display of an image according to the intension of the user. Therefore, it is possible to provide a display image desired by the user. When the image display unit 20a cannot perform the 3D display, the control unit 10a in the second embodiment automatically two-dimensionally displays an image on the image display unit 20a. Therefore, the user can display an appropriate image without the necessity of extra operation.

The control unit 10a in the second embodiment includes the storing unit 29a in which the image display unit 20a stores the individual information TIa. The individual information TIa is information for specifying a control form (e.g., a type, a model, resolution and a frame rate, pixel arrangement, a scan direction, image quality adjustment items, and a gamma value) of the image display unit 20a by the control unit 10a. The control unit 10a reads out the individual information TIa from the storing unit 29a of the image display unit 20a and controls the image display unit 20a in a control form corresponding to the read-out individual information TIa. Therefore, in the control unit 10a in the second embodiment, for example, even when an arbitrary set of the control unit 10a and the image display unit 20a is selected out of the plural control units 10a and the plural image display units 20a and used, it is possible to suppress a deficiency of control of the image display unit 20a by the control unit 10a involved in, for example, a difference of the model of the image display unit 20a while suppressing complication of the configurations and the control of the control units 10a and the image display units 20a.

C. Third Embodiment

Figure 10:
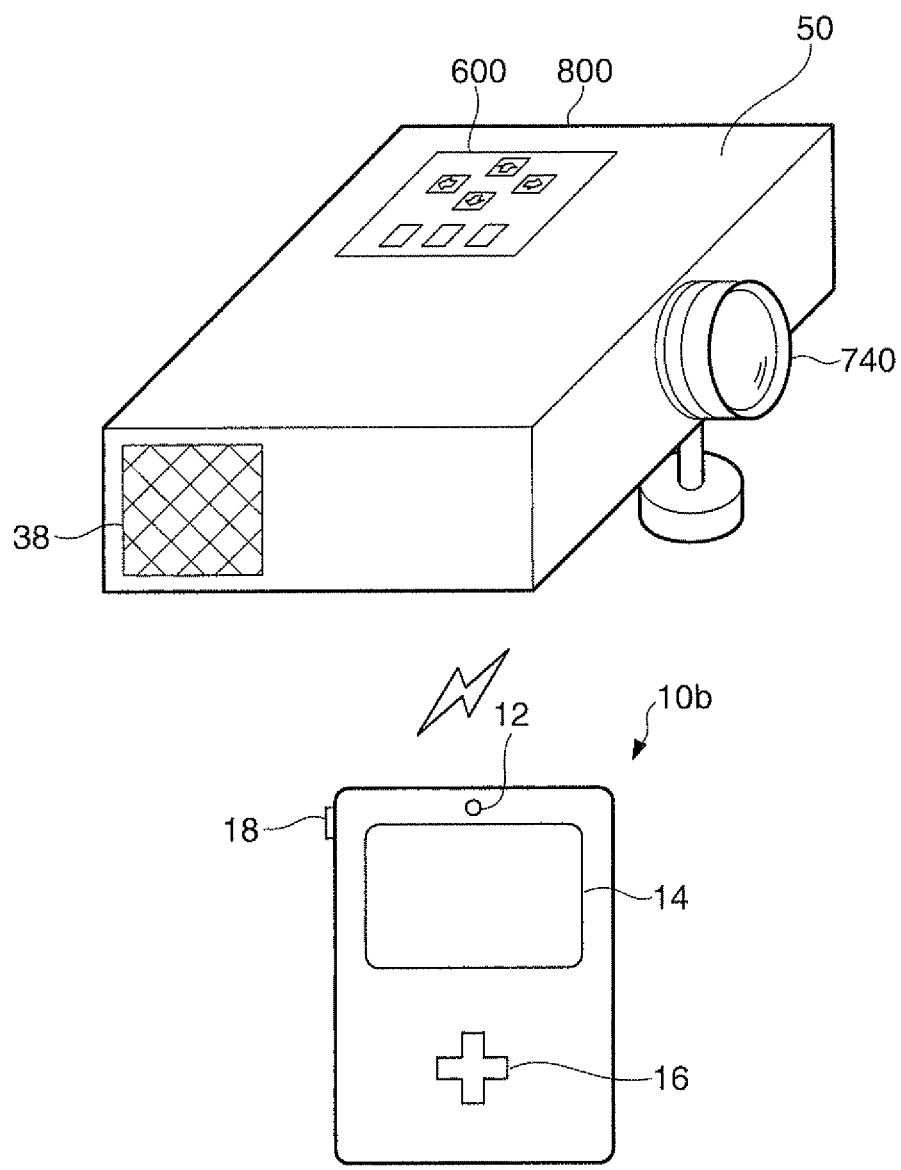
FIG. 10 is an explanatory diagram showing an external configuration of a projector functioning as a projection display device in a third embodiment.

FIG. 10 is an explanatory diagram showing an external configuration of a projector 50 functioning as a projection display device in a third embodiment. The projector 50 in the third embodiment is different from the head-mounted display device 100a in the second embodiment in that the image display device is the projector 50 and in content of individual information TIb. Otherwise, the projector 50 is the same as the head-mounted display device 100a.

The projector 50 includes a housing 800, a projection optical system 740 provided on the front surface of the housing 800, an operation unit 600 provided on an outer surface (e.g., the upper surface) of the housing 800, and a speaker 38 provided in the housing 800. The projector 50 is equivalent to the image display device in the invention that forms an image on the basis of an image signal. In the third embodiment, a control unit 10b is connected to the projector 50 by radio communication rather than by wire. A user can control image display of the projector 50 by operating the control unit 10b. The control unit 10b in the third embodiment is equivalent to the control device and the control unit in the invention.

Figure 11:
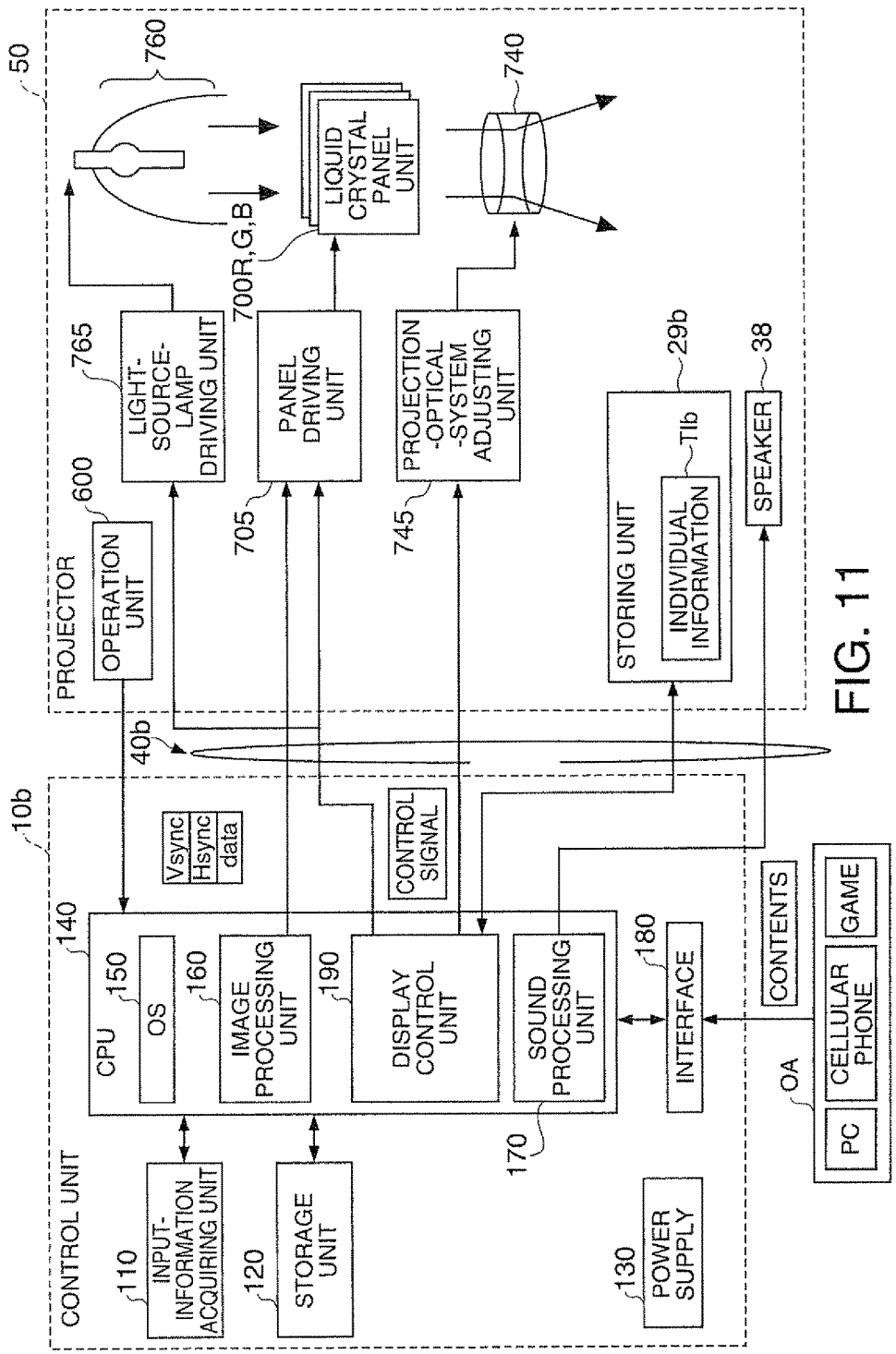
FIG. 11 is a block diagram schematically showing an internal configuration of the projector.

FIG. 11 is a block diagram schematically showing an internal configuration of the projector 50. As shown in FIG. 11, the projector 50 in the third embodiment includes an illumination optical system 760, liquid crystal panel units 700 (700R, 700G, and 700B) respectively corresponding to the three primary colors of light, the projection optical system 740, a light-source-lamp driving unit 765, a projection-optical-system adjusting unit 745, a panel driving unit 705, the operation unit 600, the speaker 38, and a storing unit 29b. The control unit 10b is the same as the control unit 10a in the second embodiment.

The light-source-lamp driving unit 765 drives a light source lamp included in the illumination optical system 760 on the basis of a control signal from the display control unit 190 of the control unit 10b. The projection-optical-system adjusting unit 745 adjusts, on the basis of a control signal from the display control unit 190, the arrangement of a lens group including plural lenses of the projection optical system 740. The image processing unit 160 applies predetermined processing to content data supplied from an external apparatus OA, generates an image signal for driving the liquid crystal panel units 700, and supplies the image signal to the panel driving unit 705. The panel driving unit 705 drives the liquid crystal panel units 700 on the basis of the image signal supplied from the image processing unit 160 and the control signal supplied from the display control unit 190.

The user can control the projector 50 in the third embodiment by operating the control unit 10b. The user can also control the projector 50 by operating the operation unit 600. The operation unit 600 receives instruction operation of the user and outputs a signal corresponding to the operation to the CPU 140. The speaker 38 amplifies a sound signal acquired by the sound processing unit 170 and supplies the sound signal according to a control signal from the sound processing unit 170.

The individual information TIb is stored in the storing unit 29b. The individual information TIb includes the device information DI, the model identification information PI, display control information SIb, and the adjustment information AI (FIG. 7). In the third embodiment, the type of the image processing device for the device information. DI is the projector 50. In the third embodiment, a situation in which the projector 50 is used (e.g., a distance to a projection surface) and the like are also stored in the adjustment information AI.

The display control unit 190 of the control unit 10b reads out the individual information TIb from the storing unit 29b of the projector 50 and stores the individual information TIb in a predetermined area of the storing unit 120. Thereafter, the control unit 10b performs display control setting processing on the basis of the device information DI, the model identification information PI, the display control information SIb, and the adjustment information AI included in the individual information TIb.

As explained above, the control unit 10b in the third embodiment performs the control of the projector 50 (the image display unit 20b). Therefore, the projector 50 does not need to include a control unit and can display an image if the projector 50 includes only components necessary minimum for the image display device (e.g., a liquid crystal panel and a light source). Therefore, with the control unit 10b in the third embodiment, it is possible to reduce the size and the weight of the projector 50 and improve portability.

D. Modifications

The invention is not limited to the embodiments and can be carried out in various forms without departing from the spirit of the invention. For example, modifications explained below are possible.

D1. Modification 1

The configuration of the head-mounted display device 100 in the embodiments is only an example and can be variously changed. For example, one of the cross key 16 and the touch pad 14 provided in the control unit 10 may be omitted. Other operation interfaces such as an operation stick may be provided in addition to or instead of the cross key 16 and the touch pad 14. Input devices such as a keyboard and a mouse can be connected to the control unit 10. The control unit 10 may receive inputs from the keyboard and the mouse. A communication unit such as a wireless LAN may be provided in the control unit 10.

Figure 12:
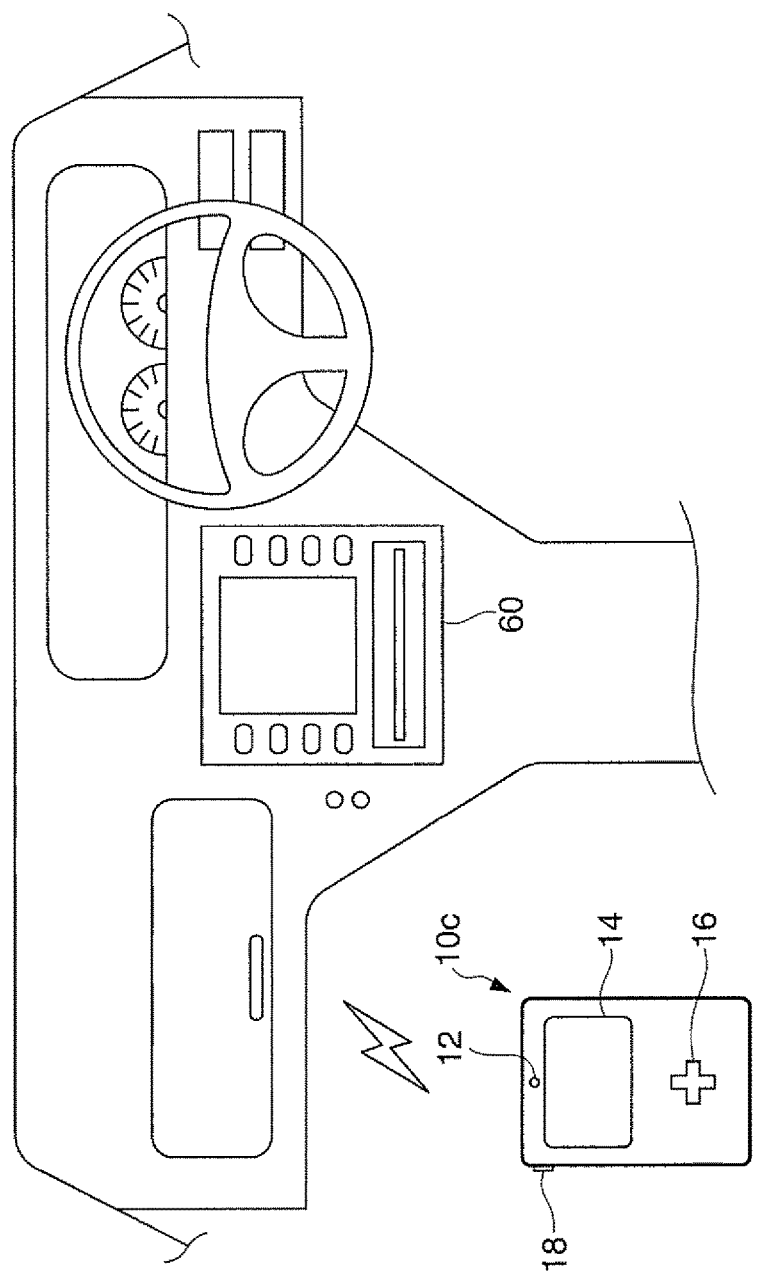
FIG. 12 is an explanatory diagram showing an external configuration of a car navigation device.

A car navigation device may be adopted as the image display device instead of the image display unit 20 worn like eyeglasses. FIG. 12 is an explanatory diagram showing an external configuration of a car navigation device 60. A control unit 10c is connected to the car navigation device 60 by radio communication. The control unit 10c reads out individual information TIc from a storing unit 29c of the car navigation device 60 and stores the individual information TIc in a predetermined area of the storing unit 120. Thereafter, the control unit 10c performs display control setting processing on the basis of the device information DI, the model identification information PI, display control information SIc, and the adjustment information AI included in the individual information TIc. Therefore, with the control unit 10c, a user can use content data such as a navigation program without mounting needless components on the car navigation device 60. The control unit 10c includes the power supply 130. However, electric power may be supplied to the control unit 10c from a cigar lighter or the like included in the car navigation device 60.

Image display units of other shapes such as a projection display device that displays an image on a projection surface through projection, a navigation display device, and an image display unit which works like a cap may be adopted. Since in the image display unit 20 of the embodiment, the control unit 10 performs control, the weight of the image display unit 20 can be reduced. Therefore, it is possible to improve wearability of the user. Further, the user can select an image display device according to a purpose by connecting the control device in the invention to a monitor of a personal computer, a cellular phone or the like. Therefore, it is possible to improve convenience of the user. The earphones 32 and 34 functioning as sound sources may be omitted. Sound may be output by connecting the control device to a sound source such as a speaker.

In the embodiments, the LCDs and the light source are used as the components that generate image light. However, another display device such as an organic EL display may be adopted instead of the LCDs and the light source. In the error notifying method, another display device such as an LED or an organic EL display may be adopted instead of the lighting unit 12 of the control unit 10.

In the embodiments, the head-mounted display device 100 is the optical transmissive head-mounted display device of a binocular type. However, the invention can also be applied to head-mounted display devices of other forms such as a video transmissive type, a non-transmissive type, and a monocular type.

In the embodiments, a part of the components realized by hardware may be replaced with software. Conversely, a part of the components realized by software may be replaced with hardware. For example, in the embodiments, the image processing unit 160 and the sound processing unit 170 are realized by the CPU 140 reading out the computer programs and executing the computer programs. However, these functional units may be realized by hardware circuit.

When a part or all of the functions of the invention are realized by software, the software (computer programs) can be provided while being stored in a computer-readable recording medium. In the invention, the "computer-readable recording medium" is not limited to portable recording media such as a flexible disk and a CD-ROM and also includes various internal storage devices in a computer such as a RAM and a ROM and an external storage device fixed to the computer such as a hard disk.

D2. Modification 2

In the embodiments, the head-mounted display device 100 may guide image lights representing the same image to the left and right eyes of the user and cause the user to visually recognize a two-dimensional image or may guide image lights representing different images to the left and right eyes of the user and cause the user to visually recognize a three-dimensional image.

In the display control setting processing in the second embodiment, first, the display control setting for the 2D display is performed and, when a selection instruction by the user is received, if the image display unit 20a is adapted to the 3D display, the display control setting for the 3D display is performed. However, the switching of the 2D display and the 3D display is not limited to this. For example, the selection instruction for the 2D display and the 3D display can be performed in the beginning of the display control setting. In this case, display control setting may be adopted in which when there is no selection instruction by the user, the display control unit 190 automatically continues the 2D display after the elapse of a predetermined time. In the 3D display, when operation from the user is received, switching to the display control setting for the 2D display can be performed. As a switching method for the display control setting, the control unit 10a may include a component (e.g., a microphone) that can recognize sound and may switch the 2D display and the 3D display according to voice of the user. The control unit 10a may notify the user, with sound via the earphones 32 and 34 or with the lighting unit 12 of the control unit 10a, that the image display unit 20a is adapted to the 3D display.

In the embodiments, content data is supplied from the external apparatus OA. However, content data may be stored in the storing unit 120 of the control unit 10 of the head-mounted display device 100 and image display may be performed on the basis of the content data stored in the storing unit 120.

D3. Modification 3

The content of the individual information TI (FIG. 4) in the embodiments is only an example. Apart of the items do not have to be included in the individual information TI and other items may be included in the individual information TI. For example, the individual information TI does not have to include the adjustment information AI.

The individual information TI does not have to include the display control information SI. Instead, information indicating a correspondence relation between the models of the image display unit 20 and the control forms of the image display unit 20 by the control unit 10 (display control information by model) may be stored in the storing unit 120 of the control unit 10. In this case, the control unit 10 only has to specify the model of the image display unit 20 on the basis of the model identification information PI of the individual information TI read out from the storing unit 29 of the image display unit 20 and control the image display unit 20 in a control form corresponding to the specified model of the image display unit 20 in the display control information by model stored in the storing unit 120 of the control unit 10. Consequently, it is possible to realize a reduction in the capacity of the storing unit 29 of the image display unit 20. The model identification information PI included in the individual information TI is equivalent to information for enabling specifying of a control form (e.g., resolution and a frame rate, pixel arrangement, a scan direction, image quality adjustment items, and a gamma value) of the image display unit 20 by the control unit 10.

D4. Modification 4

In the embodiments, the control unit 10 and the image display unit 20 are the separate components and connected by the main cable 48 and the like. However, the connection of the control unit 10 and the image display unit 20 is not limited to this. For example, the control unit 10 and the image display unit 20 may be connected by radio rather than wire and the control unit 10 may control the image display unit 20 by radio. The control unit 10 and the image display unit 20 may be integrated. The image display unit 20 may incorporate a power supply unit that supplies electric power to the control unit and the image display unit 20. By adopting such a configuration, since the functions of the control unit 10, the main cable 48, and the like are incorporated in the image display unit 20, it is possible to realize the use of the head-mounted display device 100 with high portability for the user.

D5. Modification 5

In the embodiments, in the error notifying method, the control unit 10 notifies the user of an error with the lighting unit 12 or the earphones 32 and 34 of the control unit 10. However, the error notifying method is not limited to this. For example, when the control unit 10 determines on the basis of the individual information TI of the image display unit 20 that the control unit 10 is not adapted to the image display unit 20 (the image display unit 20 cannot normally display an image), the control unit 10 transmits a signal indicating to that effect to the image display unit 20. The image display unit 20 may be an image display system that receives the signal and displays, with an error image prepared in advance, that an image cannot be normally displayed to the user. In this image display system, since the error image is directly displayed on the image display unit 20, the user can easily recognize the error notification. The control unit 10 may display the error image simultaneously with the notification by the lighting unit 12 and the earphones 32 and 34 in the embodiments and notify the user of an error.

D6. Modification 6

In the embodiments, the control unit 10 controls the image display unit 20 on the basis of the individual information T1 of the image display unit 20. However, an image display system in which the control unit 10 and the image display unit 20 authenticate each other may be adopted. For example, it is assumed that the control unit 10 performs authentication of the image display unit 20 and the image display unit 20 includes a control-device authenticating unit that can perform authentication of the control unit 10. In this case, the control unit 10 and the image display unit 20 authenticate each other and determine whether the image display unit 20 is a type or a model adapted to the control unit 10. When the control unit 10 and the image display unit 20 successfully authenticate each other, the control unit 10 controls the image display unit 20 and displays an image on the image display unit 20. Therefore, in this image display system, since the control unit 10 and the image display unit 20 authenticate each other, it is possible to realize an image display system with high security.

The entire disclosure of Japanese Patent Application Nos. 2011-022208, filed Feb. 4, 2011 and 2011-238547, filed Oct. 31, 2011 are expressly incorporated by reference herein.

What is claimed is:

1. A head-mounted display device comprising:
    an image display unit including:
        a right image-light generating unit and a left image generating unit that generates image light representing a virtual image, a right light guide unit and a left light guide unit that guides the generated image light to eyes of a user, the image display unit causing the user to visually recognize the virtual image in a state in which the head-mounted display device is mounted on a head of the user; and a storing unit that stores individual information for specifying a control form of the image display unit by a control device, the individual information including model identification information of the image display unit, a basic position adjustment amount stored in the image display unit, and a user set position adjustment amount set by a user; and the control device connected to the image display unit, the control device including a processor configured to:
acquire the individual information from the storing unit of the image display unit, the individual information being stored in the storing unit of the image display unit without being stored in the control device;

control the image display unit on the basis of the acquired individual information, determine, on the basis of the acquired model identification information, whether the model of the image display unit is a model that can be controlled by the control device, and in response to determining that the model of the image display unit is a model that can be controlled by the control device, perform image forming position adjustment on the virtual image in the image display unit on the basis of the basic position adjustment amount and the user set position adjustment amount; the virtual image being different than an image the user sees on the image display unit without the superimposing of the virtual image.

2. The head-mounted display device according to claim 1, wherein the individual information includes model identification information for identifying a model of the image display unit, the control device includes a storing unit that stores control information by model indicating correspondence between models and control forms of the image display unit, and the control device specifies, on the basis of the model identification information, a model of the image display unit actually connected to the control device and controls image display by the image display unit in a control form associated with the specified model.

3. The head-mounted display device according to claim 1, wherein the individual information includes adjustment information for specifying an image quality adjustment form of the virtual image recognized by the user, and the control device causes the image display unit to adjust image quality in a form corresponding to the adjustment information.

4. The head-mounted display device according to claim 3, wherein the adjustment information includes stored adjustment information corresponding to at least one particular user indicating a correspondence between each one of the at least one particular user and image quality adjustment forms of the corresponding particular user of the image display unit, the control device acquires information for specifying one of the at least one particular user of the image display unit actually connected to the control device, and the control device causes the image display unit to adjust image quality in a form associated with the specified one of the at least one particular user.

5. The head-mounted display device according to claim 1, wherein the control device checks an image display state of the image display unit at predetermined timing and, upon the image display state not being normal, updates the control form of the image display unit by the control device on the basis of the individual information.

6. The head-mounted display device according to claim 1, wherein, upon the control device not being able to normally perform control of the image display of the image display unit actually connected to the control device, the control device notifies the user to that effect directly or via the image display unit.

7. The control device according to claim 1, further comprising a notifying unit that notifies, when the control device cannot normally cause the user to visually recognize an image via the image display device, the user to that effect.

8. The control device according to claim 7, wherein the control unit can switch, according to operation, a form for causing the user to two-dimensionally visually recognize an image, which the control unit causes the user to visually recognize via the image display device, and a form for causing the user to three-dimensionally visually recognize the image and, when determining on the basis of the individual information that the image display device is not adapted to the form for causing the user to three-dimensionally visually recognize the image, causes the user to two-dimensionally visually recognize the image irrespective of the operation.

9. The control device according to claim 7, wherein the control device is integrated with the image display device.

10. The control device according to claim 7, wherein
the individual information includes device identification information for identifying the type of the image display device and a model identification information for identifying a model of the image display device, the control device includes a storing unit that stores control information by device indicating correspondence between types and control forms of the image display device and control information by model indicating correspondence between models and control forms of the image display device, and the control device specifies, on the basis of the device identification information and the model identification information, a type and a model of the image display device actually connected to the control device and controls the image display device in a control form associated with the specified type and model of the image display device.

11. The control device according to claim 7, wherein the image display device is one of a head-mounted display device, a projection display device, and a navigation display device.

12. An image display system comprising:
an image display device that causes a user to visually recognize an image; and
the control device according to claim 7, wherein
the image display device receives a signal transmitted by the control device when the control device determines on the basis of the individual information that the model of the image display device is a model that cannot be controlled by the control device, and the image display device causes the user to visually recognize an error image prepared in advance in order to notify the user that the control device cannot control the image display device.

13. An image display system comprising:
an image display device that causes a user to visually recognize an image; and
the control device according to claim 7, wherein
the image display device includes a power supply unit that supplies electric power to the image display device and the control device.

14. An image display system comprising:
the control device according to claim 7 including an image-display-device authenticating unit that performs authentication of the image display device connected to the image display system; and
an image display device including a control-device authenticating unit that performs authentication of the control device connected to the image display system.

15. The head-mounted display device according to claim 1, wherein the individual information further includes scan control information including scan direction information.

16. The head-mounted display device according to claim 1, wherein the individual information is stored only in the storing unit of the image display unit.

17. A control method for a head-mounted display device including: an image display unit including a right image-light generating unit and a left image-light generating unit that generates image light representing an image and a right light guide unit and a left light guide unit that guides the generated image light to eyes of a user, the image display unit causing the user to visually recognize a virtual image in a state in which the head-mounted display device is mounted on a head of the user; and a control device that is detachably connected to the image display unit and controls image display by the image display unit actually connected to the control device, the image display unit including a storing unit that stores individual information for specifying a control form of the image display unit by the control device, the individual information including model identification information of the image display device, the control method comprising:
the control device reading out the individual information from the storing unit of the image display unit actually connected to the control device and controlling image display by the image display unit in a form corresponding to the read-out individual information, the individual information being stored in the storing unit of the image display unit without being stored in the control device;
the control device determining, on the basis of the acquired model identification information, whether the model of the image display device is a model that can be controlled by the control device, and if the control device determines that the model of the image display device is a model that can be controlled by the control device;
the control device performing image forming position adjustment on the virtual image in the image display device on the basis of a basic position adjustment amount stored in the image display device during product shipment and a user set position adjustment amount set by a user, the virtual image being different than an image the user sees on the image display device without the superimposing of the virtual image.

18. The control method for a head-mounted display device according to claim 17, wherein the individual information further includes scan control information including scan direction information.

* * * * *